Jan. 28, 1958 — W. T. DONKIN ET AL — 2,821,379
TORQUE SPRING
Filed March 10, 1954
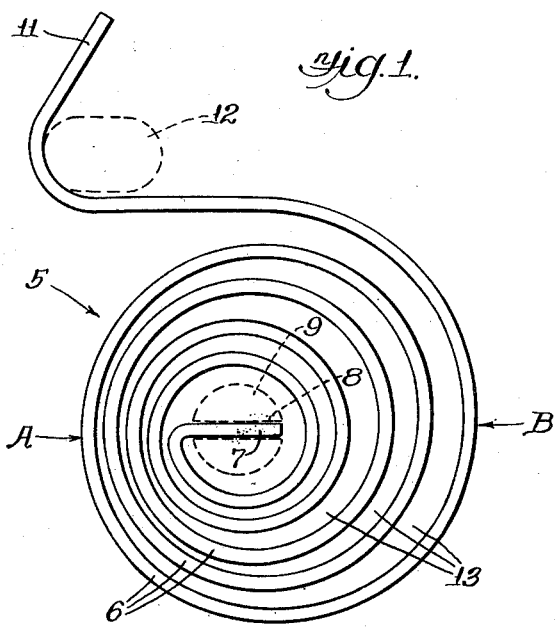
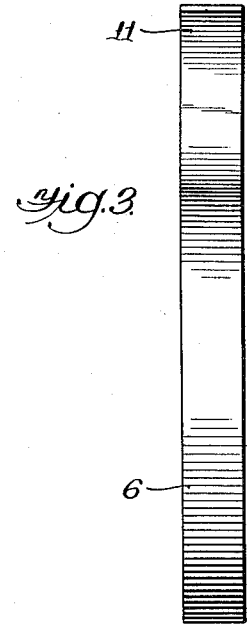
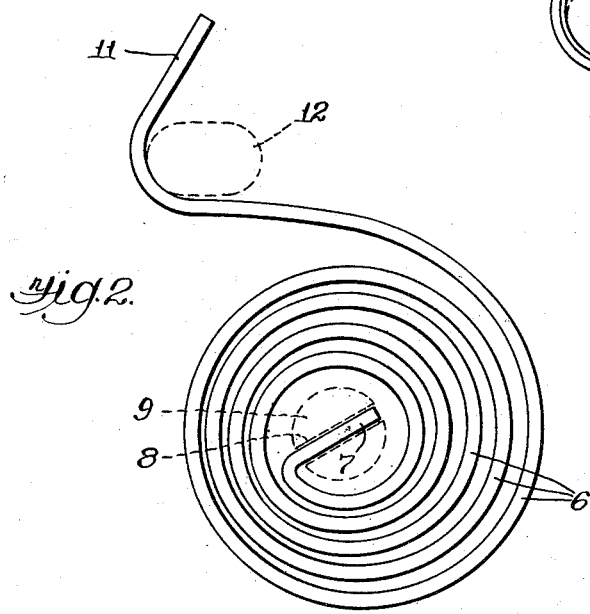
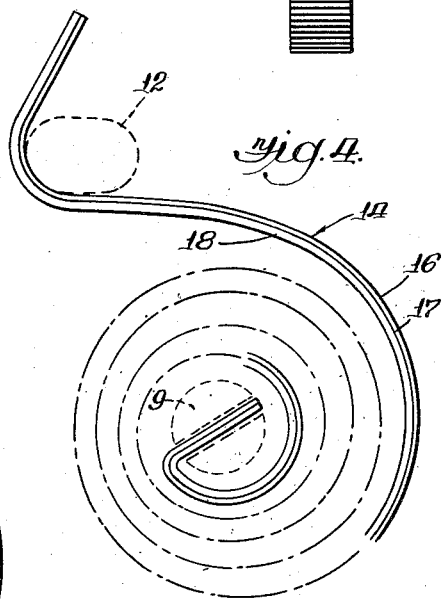
Inventors:
Wilfred T. Donkin
Frank S. Sabik
BY
Gary, Desmond & Parker
Attys.

United States Patent Office 2,821,379
Patented Jan. 28, 1958

2,821,379

TORQUE SPRING

Wilfred T. Donkin, Coldwater, Mich., and Frank G. Sabik, Berwin, Ill., assignors to Mechanical Spring Fabricators, Inc., Chicago, Ill., a corporation of Delaware Application March 10, 1954, Serial No. 415,360

7 Claims. (Cl. 267—1)

This invention relates to springs and more particularly to springs designed to yieldably resist torque loads.

Springs of this type have many uses in the mechanical arts and are now commonly provided to counterbalance various structures, such as the hoods and windows of automobiles, to actuate temperature control mechanisms, etc. Springs heretofore provided for such uses have usually been of the spiral type in which a length of flat hardened steel strip is spirally wound to follow a curve having a constantly increasing radius of curvature, with the spacing between adjacent convolutions of the spring progressively increasing from the inner end toward the outer end thereof.

In the use of a torque spring of this type to counterbalance, for example, the window of an automobile, the spring is pretensioned during assembly of the car and the several convolutions of the spring are moved radially into frictional engagement with each other during opening movement of the window, thereby causing a binding action between adjacent convolutions and objectionable vibration, chattering noises and shock loads. To reduce such binding action, it has been common practice to apply grease to the several convolutions of the spring during assembly of automobiles, but it is well known in this art that the grease is, within a relatively short period of use, squeezed out from between the convolutions and cannot readily be replaced.

It is therefore an object of the present invention to provide a coil-type spring effective to yieldably resist torque loads without causing a binding action between adjacent convolutions of the spring, thereby eliminating vibration, shock loads, chattering noises and/or breakage resulting from such binding action.

Another object of the invention resides in the provision of a torque spring in which the radial spacing between adjacent convolutions is greater at one side of the spring than at the diametrically opposed side thereof to prevent a binding action between adjacent convolutions during the application of normal torque loads on the spring.

A further object of the invention resides in the provision of a torque spring formed from a bimetal strip whereby the ends of the strip move relative to each other responsive to variations in temperature.

This invention embodies other novel features, details of construction and arrangement of parts which are hereinafter set forth in the specification and claims and illustrated in the accompanying drawings, wherein:

Fig. 1 is a plan view illustrating a spring embodying features of the invention, the spring being shown in a pretensioned condition to yieldably resist opening movement of a car window or the like.

Fig. 2 is a plan view showing the relative positions of the several convolutions of the spring after a further torque load is applied thereto.

Fig. 3 is a side elevational view of the spring.

Fig. 4 illustrates a modified form of the invention in which the spring is shown as formed from a bimetal strip whereby the ends of the spring are moved relative to each other responsive to variations in the temperature of the surrounding atmosphere.

Referring now to the drawing for a better understanding of the invention, and more particularly to Figs. 1 to 3 therein, the spring 5 is shown as comprising a length of resilient flat strip metal in wound or coiled form to provide several coplanar convolutions 6, the inner end 7 of the spring being flat for engagement in a slot 8 formed in the end of a shaft 9, and the outer end of the spring being in the form of a hook 11 spaced from the adjacent convolution for engagement by a member 12.

In the manufacture of the spring illustrated in Fig. 1 in the drawing, the several convolutions 6 are preferably normally in light abutting engagement at one side of the spring, as indicated at A, and are spaced apart at the other side of the spring, as indicated at B, to define a series of crescent-shape openings 13 radially aligned and of progressively increasing area from the center of the innermost convolution toward the side B of the spring.

When the spring is pretensioned, as illustrated in Fig. 1, or subjected to torque load by rotating the shaft 9 in a clockwise direction relative to a fixed member 12, as illustrated in Fig. 2, the several convolutions 6 remain in closely spaced relationship at side A of the spring and are contracted to gradually decrease the spacing therebetween at side B of the spring until the torque load capacity of the spring is attained. It will thus be noted that the spring may be subjected to or relieved from torque loads without causing binding of adjacent convolutions and without producing vibration, shock loads and chattering noises resulting from such binding of adjacent convolutions.

A spring embodying features of the invention is preferably first formed from a length of unhardened spring steel stock and then hardened by conventional heat treatment methods to provide the desired physical properties.

Fig. 4 illustrates a modified form of the invention in which the spring 14 is shown as formed from a resilient bimetallic strip 16 comprising two strips of metal 17 and 18 having relatively different coefficients of expansion whereby variations in temperature effects relative movements of the ends of the spring to acutate a suitable temperature control mechanism.

Although springs of this type herein shown and described are usually formed from lengths of flat strip metal stock, and have been so shown and described, it is apparent that springs embodying features of the invention may be formed from metal stock of different cross sections, such as round stock, half-round stock, etc.

In each form of the invention herein shown and described, it will be noted that the spacing between adjacent convolutions of the spring between the axis thereof and side B progressively increases outwardly radially, with the smallest spacing between the innermost convolutions and the greatest spacing between the outermost convolutions.

While the invention has been shown in but two forms, it is obvious to those skilled in the art that it is not so limited, but is susceptible of various changes and modifications without departing from the spirit and scope of the claimed invention.

We claim:

1. A spring comprising a length of resilient metal stock in coil form having coplanar inner, outer and intermediate convolutions, a rotatable shaft secured to the inner end of the spring, a fixed member engaged to the outer end of the spring, adjacent convolutions normally being in abutting engagement at one side of said spring and spaced a substantial distance apart at the other side thereof to define therebetween a series of radially aligned crescent-shape openings of progressively increasing area from the center of the spring toward the outer convolution thereof to prevent frictional binding engagement of adjacent convolutions during application of normal torque loads on the spring, said convolutions being substantially equally closely spaced when the spring is torque loaded to capacity responsive to rotation of said shaft.

2. A spring comprising a length of resilient metal stock in coil form having coplanar inner, outer and intermediate convolutions, a rotatable shaft secured to the inner end of the spring, a fixed member engaged to the outer end of the spring, adjacent convolutions normally being in abutting engagement at one side of said spring and spaced a substantial distance apart at the other side thereof to define therebetween a series of crescent-shaped openings to prevent frictional binding engagement of adjacent convolutions during application of normal torque loads on the spring, said convolutions being substantially equally closely spaced when the spring is torque-loaded to capacity responsive to rotation of said shaft.

3. A spring comprising a length of resilient metal stock in coil form having coplanar inner, outer and intermediate convolutions, a rotatable shaft secured to the inner end of the spring, a fixed member engaged to the outer end of the spring, adjacent convolutions normally being in abutting engagement at one side of said spring and spaced a substantial distance apart at the other side thereof to define therebetween a series of crescent-shaped openings of progressively increasing area from the center of the spring toward the outer convolution thereof to prevent frictional binding engagement of adjacent convolutions during application of normal torque loads on the spring, said convolutions being substantially equally closely spaced when the spring is torque-loaded to capacity responsive to rotation of said shaft.

4. A spring comprising a length of resilient flat strip metal stock in coil form having coplanar inner, outer and intermediate convolutions, a rotatable bifurcated shaft, a fixed member connected to the outer convolution, adjacent convolutions normally being in proximity at one side of said spring and spaced a substantial distance apart at the other side thereof to define therebetween a series of crescent-shaped openings of progressively increasing area from the center of the spring toward the outer convolution thereof to prevent frictional binding engagement of adjacent convolutions during application of normal torque loads on the spring, said convolutions being substantially equally closely spaced when the spring is torque-loaded to capacity responsive to rotation of said shaft, the innermost convolution having a flat portion engaged by said bifurcated shaft.

5. A spring comprising a length of resilient metal stock in coil form having coplanar inner, outer and intermediate convolutions, a bifurcated rotatable shaft, a fixed member, adjacent convolutions normally being in proximity at one side of said spring and spaced a substantial distance apart at the other side thereof to define therebetween a series of crescent-shaped openings of progressively increasing area from the center of the spring toward the outer convolution thereof to prevent frictional binding engagement of adjacent convolutions during application of normal torque loads on the spring, said convolutions being substantially equally closely spaced when the spring is torque-loaded to capacity responsive to rotation of said shaft, the innermost convolution having a flat portion engaged by said bifurcated shaft, and the outer convolution having a hook portion engaging said fixed member.

6. A spring comprising a length of resilient metal stock in coil form having coplanar inner, outer and intermediate convolutions, a rotatable shaft secured to the inner end of the spring, a fixed member engaged to the outer end of the spring, adjacent convolutions normally being in proximity at one side of said spring and spaced a substantial distance apart at the other side thereof to define therebetween a series of radially aligned crescent-shaped openings of progressively increasing area from the center of the spring toward the outer convolution thereof to prevent frictional binding engagement of adjacent convolutions during application of normal torque loads on the spring, said convolutions being substantially equally closely spaced when the spring is torque-loaded to capacity responsive to rotation of said shaft.

7. A spring comprising a length of flat resilient bimetallic stock in coil form having coplanar inner, outer and intermediate convolutions, a rotatable shaft secured to the inner end of the spring, a fixed member engaged to the outer end of the spring, adjacent convolutions normally being in proximity at one side of said spring and spaced a substantial distance apart at the other side thereof to define therebetween a series of radially aligned crescent-shaped openings of progressively increasing area from the center of the spring toward the outer convolution thereof to prevent frictional binding engagement of adjacent convolutions during application of normal torque loads on the spring, said convolutions being substantially equally closely spaced when the spring is torque-loaded to capacity responsive to rotation of said shaft.

References Cited in the file of this patent

UNITED STATES PATENTS

| | | |
|---|---|---|
| 155,129 | Warren | Sept. 15, 1874 |
| 1,178,862 | Lattig | Apr. 11, 1916 |
| 1,365,701 | Kliesrath et al. | Jan. 18, 1921 |
| 1,486,381 | Jaenicken | Mar. 11, 1924 |
| 1,589,467 | Hassler | June 22, 1926 |
| 2,241,969 | Tappan | May 13, 1941 |
| 2,675,578 | Atwood et al. | Apr. 20, 1954 |